United States Patent [19]

Young

[11] Patent Number: 4,978,511

[45] Date of Patent: * Dec. 18, 1990

[54] METHODS FOR SELECTIVELY RECOVERING VANADIUM FROM PHOSPHORIC ACID AND VANADIUM SOURCES

[75] Inventor: Donald C. Young, Fullerton, Calif.

[73] Assignee: Union Oil Company of California, Los Angeles, Calif.

[*] Notice: The portion of the term of this patent subsequent to Jul. 25, 2006 has been disclaimed.

[21] Appl. No.: 382,846

[22] Filed: Jul. 20, 1989

Related U.S. Application Data

[63] Continuation-in-part of Ser. No. 110,172, Oct. 19, 1987, Pat. No. 4,851,199, which is a continuation-in-part of Ser. No. 688,683, Jan. 3, 1985, abandoned.

[51] Int. Cl.$^5$ ............................................. C01G 31/02
[52] U.S. Cl. ...................................... 423/65; 423/67; 423/321 R
[58] Field of Search ....................... 423/65, 67, 321 R; 75/101 R

[56] References Cited

U.S. PATENT DOCUMENTS

| | | | |
|---|---|---|---|
| 1,526,943 | 2/1925 | Thews | 423/68 |
| 2,130,579 | 9/1938 | Bowman | 423/67 |
| 3,190,719 | 6/1965 | Kelmers et al. | 423/67 |
| 3,615,167 | 10/1971 | Berthoux et al. | 423/67 |
| 3,700,415 | 10/1972 | Koerner et al. | 23/312 |
| 3,711,591 | 1/1973 | Hurst et al. | 423/10 |
| 3,835,214 | 9/1974 | Hurst et al. | 423/10 |
| 3,836,475 | 9/1974 | Baldwin et al. | 252/301.1 |
| 4,212,849 | 7/1980 | Lucid et al. | 423/10 |
| 4,241,027 | 12/1980 | Bowerman et al. | 423/10 |
| 4,341,743 | 7/1982 | Tebbe | 423/63 |
| 4,383,978 | 5/1983 | Betlz et al. | 423/9 |
| 4,427,641 | 1/1984 | Yoshikawa et al. | 423/18 |
| 4,452,768 | 6/1984 | Gradl et al. | 423/321 |
| 4,479,924 | 10/1984 | Plessen et al. | 423/321 |
| 4,526,762 | 7/1985 | Brown | 423/64 |
| 4,851,199 | 7/1989 | Young | 423/65 |

FOREIGN PATENT DOCUMENTS 49064  4/1982  European Pat. Off. ............. 423/65

*Primary Examiner*—Melvyn J. Andrews
*Attorney, Agent, or Firm*—Gregory F. Wirzbicki; Michael H. Laird

[57] ABSTRACT

Vanadium is selectively recovered from vanadium-containing phosphoric acid solutions also containing metals other than vanadium by selectively converting the dissolved vanadium to a vanadate compound insoluble in the phosphoric acid solution and separating the resulting insoluble vanadate compound, free of other metal compounds, from the phosphoric acid solution. The dissolved vanadium can be converted to an insoluble vanadate by reaction with oxidants and/or cations which form phosphoric acid-insoluble vanadates. These methods can be employed to selectively recover vanadium from phosphoric acid solutions containing other metals. They also can be employed to recover vanadium compounds from ores, scrap metal, and other vanadium sources by dissolving the vanadium from the vanadium source in phosphoric acid and recovering the vanadium as an insoluble compound from the phosphoric acid as described. Alternatively, the vanadium can be dissolved in a strong acid other than phosphoric acid, and sufficient phosphoric acid can be added to the resulting solution to ensure selective precipitation of impurity-free vanadates by the procedure described above.

22 Claims, No Drawings

METHODS FOR SELECTIVELY RECOVERING VANADIUM FROM PHOSPHORIC ACID AND VANADIUM SOURCES

RELATED APPLICATIONS

This application is a continuation-in-part of my copending application Ser. No. 07/110,172 filed Oct. 19, 1987, for METHODS FOR RECOVERING VANADIUM FROM PHOSPHORIC ACID, now U.S. Pat. No. 4,851,199 which was a continuation-in-part of Ser. No. 06/688,683 filed Jan. 3, 1985 now abandoned for METHODS FOR RECOVERING VANADIUM FROM PHOSPHORIC ACID AND VANADIUM SOURCES.

BACKGROUND OF THE INVENTION

1. Field of the Invention

This invention relates to the field of vanadium recovery, and, in particular, it relates to methods for selectively recovering vanadium from phosphoric acid and from ores, metals, and other sources.

2. Description of the Art

Vanadium is employed in a wide variety of utilities including the manufacture of ferrous and non-ferrous metals, as a target material for x-rays, and for the manufacture of a variety of vanadium compounds many of which, in turn, are employed for the manufacture of catalysts such as hydrocarbon conversion catalysts and catalysts for the manufacture of sulfuric acid. It is not found in its elemental form in nature but is prevalent in more than 65 vanadium-containing minerals and rocks, principle of which are patronite, roscolite, carnotite, and vanadanite. Vanadium is also found in a variety of processed materials and manufactured articles including wet-process phosphoric acid, partially or completely processed ores (including minerals and rocks) and mine tailings (including mining and processing residues), ferrous and non-ferrous vanadium alloys, petroleum code, spent phosphoric acid pickling acids, petroleum, petroleum ash, ferrophosphorous slag from elemental phosphorous manufacture, coal and other sources.

The quantity of vanadium contained in just one source —merchant grade (green) wet-process phosphoric acid—would be sufficient, if recoverable, to supply a major portion, if not all, of the vanadium employed in industry. Wet-process phosphoric acid is typically defined as phosphoric acid which results from the dissolution of phosphate rock (calcium phosphate) in sulfuric acid to form free phosphoric acid and calcium sulfate. The latter, being insoluble, is separated from the phosphoric acid product by filtration to obtain a crude phosphoric acid solution to varying concentration (depending on processing conditions). The crude acid is a highly impure material, generally dark in color, and it contains relatively large amounts of dissolved metals, sulphates and smaller amounts of fluorides, fluorosilicates, and other salts of aluminum, magnesium, iron, uranium, vanadium, and other metals, as well as suspended organic matter.

Wet-process acid typically contains between about 25 and about 52 weight percent phosphorous expressed as $P_2O_5$ and about 0.1 to about 2 weight percent vanadium expressed as the metal. Vanadium is usually present in phosphoric acid, including wet-process acid and other phosphoric acid solutions, in a reduced state as the tri-or tetravalent vanadium-phosphate complex. This complex is very difficult to break chemically, and it is even more difficult to selectively recover vanadium from phosphoric acid solutions which contain other dissolved and/or complexed metals and metal salts.

While it is known that vanadium can be precipitated from phosphoric acid by neutralization of the acid to a pH of about 7, such treatment also results in the precipitation of other metal compounds. The vanadium can be recovered from such precipitates only by complex extraction procedures which require the use of relatively expensive organic extractants. One such process described by Hurst et al., in U.S. Pat. No. 3,835,214 involves the extraction of vanadium and/or uranium, while in a reduced valent state, from wet-process phosphoric acid into an organic phase containing certain orthophosphoric acid esters. In another process described by Hurst et al. in U.S. Pat. No. 3,711,591 and by lucid et al. in U.S. Pat. No. 4,212,8949, the vanadium and/or uranium are converted to an oxidized state and are extracted into an organic phase containing certain di-substituted esters of orthophosphoric acid together with a triorganophosphine oxide. The phosphoric acid esters involved in such processes include relatively expensive compounds such as di-2-ethylhexyl)-phosphoric acid combined with trioctylphosphine oxide, and dioctylphenyl phosphoric acid combined with trioctylphosphine oxide. One variation of such processes, which is described by Tebbe in U.S. Pat. No. 4,341,743, involves initially admixing wet-process phosphoric acid containing vanadium, and optionally uranium, with a mixture of a disubstituted ester of orthophosphoric acid and a triorganophosphine oxide as described by Hurst et al. and Lucid et al., supra, followed by gradual addition of hydrogen peroxide to oxidize the vanadium and uranium to vanadium (V) and uranium (VI) in order to increase hydrogen peroxide efficiency. According to Tebbe, supra, the lower valence states of vanadium and uranium are inefficiently extracted into the organic phase, and the conversion of those elements to their higher oxidation states markedly increases extraction efficiency.

Similar problems exist with the extraction of vanadium from acids other than phosphoric acid, since such acids, which contain significant amounts of dissolved vanadium, invariably contain other metals and compounds which complicate attempts to selectively recover vanadium from such solutions.

SUMMARY OF THE INVENTION

I have now found that vanadates can be recovered from vanadium-containing phosphoric acid solutions by converting the vanadium, at a pH of about 2 or less, to a vanadate compound which is insoluble in the phosphoric acid solution and selectively separating the resulting, insoluble vanadate from the phosphoric acid solution in the absence of other metal impurities. Pentavalent vanadium, when present in phosphoric acid, can be present primarily as vanadate anion and, as such, it can be selectively recovered from phosphoric acid by admixing the phosphoric acid with a compound having a cation which forms insoluble vanadates and which does not form insoluble phosphates. Vanadium in reduced, states, i.e., having a valence below 5, can be recovered by oxidizing it to the pentavalent state and selectively recovering the resulting pentavalent vanadium as an insoluble vanadate.

These methods can be employed to selectively recover vanadium from phosphoric acid solutions which contain a variety of other metal impurities which result from the phosphoric acid manufacturing process or from exposure of the phosphoric acid to other materials. For instance, these methods can be employed to recover vanadium from ores, scrap metal, and the like, by dissolving the vanadium in such sources with phosphoric acid and precipitating the vanadium as described above. Of course, the useful, vanadium-containing, phosphoric acid solutions can be formed by adding phosphoric acid to other vanadium-containing solutions, such as solutions of other strong mineral and/or organic acids.

The methods of this invention have numerous, significant benefits and advantages over the methods described in the art. For instance, these methods can be employed to recover vanadium from phosphoric acid with insignificant, if any, neutralization of the acid. Consequently, they enable the recovery of a commercially valuable material (vanadium) and reduce vanadium toxicity of the phosphoric acid which is beneficial for agricultural and food use. These methods can be employed to selectively recover vanadates in pure form, free of other metal impurities, in the absence of subsequent separation procedures. They involve simplified process steps as compared to the prior art and the use of inexpensive reactants (oxidants and precipitating cations), and they thereby avoid the need for relatively expensive organic extractants. They eliminate duplicative extraction steps and the need for subsequent recovery of vanadium from the extractant phase. Since these methods can be employed to quantitatively recover vanadium from phosphoric acid, they make possible improved processes for recovering vanadium from vanadium sources such as ores, metals, and other materials.

DETAILED DESCRIPTION OF THE INVENTION

This invention provides methods for selectively recovering vanadates from phosphoric acid solutions also containing other metals which involve conversion of the vanadium to a phosphoric acid-insoluble vanadate compound and selective recovery of the resulting, insoluble vanadate compound free of other metal impurities. In particular, these methods involve the conversion of vanadium dissolved in phosphoric acid selectively to phosphoric acid-insoluble vanadates at pH levels of about 2 or less and thereby provide for the direct recovery of pure vanadate compounds from phosphoric acid. The pure vanadate compounds free of other metals which are selectably obtained by the methods of this invention are also known as simple vanadates. Vanadates free of other metal impurities, i.e. simple vanadates, are compounds in which the anion is comprised of pentavalent vanadium and oxygen. Such compounds distinguish from complex vanadates, also known as heteropoly acids, which contain metals or psuedo-metals (such as phosphorus) other than vanadium in anionic form. Complex vanadates have been thoroughly characterized, and examples of other metals and psuedo metals contained in complex vanadates as a part of the compound per se, i.e. in anionic form are molybdenum, tungsten, tellurium, iron, chromium, aluminum, cobalt, rhodium, magnesium and phosphorus. Typically, these "other atoms" contained in complex vanadates exhibit 6-fold coordination with oxygen in the anions. (Van Wazer, J.R., Phosphorus and its compound, Vol. 2, Interscience, N.Y., 1958, pp. 559–60.)

Pentavalent vanadium contained in phosphoric acid solutions can be converted to phosphoric acid-insoluble vanadate compounds by admixing with the solution a cation which forms phosphate-insoluble vanadate compounds and which does not form insoluble phosphates under the contacting conditions employed. Vanadium in reduced valence states in phosphoric acid solutions can be converted to phosphoric acid-insoluble compounds (and recovered as such) by simultaneous and/or sequential oxidation of the reduced vanadium to pentavalent vanadium and reaction of the resulting pentavalent vanadium with one or more cations which form phosphoric acid-insoluble vanadates.

The methods can also be employed to recover vanadium from all sources from which vanadium can be extracted (dissolved) by phosphoric acid and/or other acids. Thus, vanadium can be selectively recovered from rocks, minerals, metals, and other vanadium sources selectively and quantitatively by first dissolving vanadium contained in the vanadium source in phosphoric acid and/or other strong acid and then converting the dissolved vanadium selectively to an insoluble vanadate by the procedures discussed above.

The methods of this invention can be employed to remove vanadium from all types of phosphoric acid solutions which contain dissolved vanadium in any valence state. Thus, these methods can be employed to remove vanadium from solutions containing orthophosphoric acid or the various forms of polyphosphoric acid (sometimes referred to as pyrophosphoric acid, metaphosphoric acid, superphosphoric acid and/or by other designations). Such acids can be obtained from any source including wet-process phosphoric acid, furnace grade acids, phosphoric acid derived from phosphate rock by the so-called hydrochloric acid process, partially purified acids, phosphoric acid which either has been employed to treat materials which contain vanadium (and which thereby contains dissolved vanadium) or which has been employed to extract vanadium from vanadium sources, and combinations of such acids.

The phosphoric acid solutions useful in this invention will usually be very acidic. Typically, the pH of the phosphoric acid solution will be about 2 or less, generally about 1 or less. Most concentrated phosphoric acid solutions have pH levels of about 1 or less. The acid solution should containing sufficient phosphoric acid to maintain the vanadium and other metals in dissolved form until the vanadium is selectively precipitated. Thus, the solution will usually contain at least about 2 weight percent, preferably at least about 10 weight percent, most preferably at least about 30 weight percent, and typically about 2 to about 99.9 weight percent phosphoric acid expressed as $P_2O_5$. Presently preferred solutions have $P_2O_5$ contents of at least about 40 weight percent and will generally contain about 30 to about 99.9 weight percent equivalent $P_2O_5$ as phosphoric acid. Accurate determination of pH in concentrated, strong acids, i.e. at pH levels below 2 or below 1, is difficult by some standard procedures, such as with pH meters using standard calomel cells. However, that the pH of a strong acid solution is about 2 or less or about 1 or less can be reliably determined with commercially available flowing-junction reference cells using platinum electrodes, and the use of such pH measuring equipment, or equipment with comparable capability, is recommended where accurate determination of low pH levels in concentrated acid solutions is desired.

Phosphoric acid solutions which contain very minor amounts of vanadium can be treated to recover vanadium in accordance with the methods of this invention. Typically, however, the acids will contain at least about 0.1 weight percent and generally about 0.1 to about 10 weight percent vanadium expressed as the metal. Quite often, the treated acid will also contain one or more of a variety of other dissolved materials, including metal impurities, such as iron, manganese, calcium, uranium, fluorine, fluorosilicates, sulfuric acid (and possibly other acids), and other metals or compounds. Relatively high concentrations of such impurities are typically contained in crude phosphoric acids (derived from phosphate rock by the $H_2SO_4$ and HCl processes) and in acids which have been employed to leach and/or dissolve vanadium from minerals, alloys, or other vanadium sources. Acids other than phosphoric acids useful in leaching and/or dissolving vanadium from vanadium sources, or which contain vanadium as a result of contact with such vanadium sources, include strong organic and inorganic acids capable of producing a pH below 2, preferably below 1, in distilled water. Illustrative strong inorganic acids include nitric, hydrochloric, sulfuric, and hydrofluoric acids and combinations of these, with or without phosphoric acid. Illustrative organic acids include mono- and polysubstituted and unsubstituted carboxylic acids typically having 1 to about 20, preferably 1 to about 10, carbon atoms per molecule. The mono- and dicarboxylic acids and acid anhydrides which form such acids upon hydration are presently preferred organic acids. Illustrative organic acids include acetic, formic, citric, oxalic, maleic acids, etc., and mixtures of such acids with other organic and/or inorganic acids. The useful organic acids also include bacteria-generated acid mixtures which are sometimes employed to leach valuable metals from ores and mine tailings.

It is essential only that the vanadium-containing phosphoric acid solution contain sufficient phosphoric acid, e.g. within the ranges discussed above, to prevent precipitation of impurities other than vanadates when treated with the described oxidants and/or precipitating cations as discussed herein. Phosphoric acid can be added, when required, either as the acid or as a phosphate which converts to phosphoric acid in the strongly acidic solution, e.g. in a solution of organic or inorganic acid other than phosphoric acid. In the alternative, the specific quantity of phosphoric acid needed to be added to the vanadium-containing solution can be readily determined by adding different amounts of phosphoric acid, e.g. 1, 5, 10, 20 percent, etc., to different samples of the vanadium-containing acid solution to be treated, adding the oxidant and/or precipitating cation to precipitate the vanadium as a vanadate, and analyzing the precipitates by conventional analytical techniques to determine the phosphoric acid concentration below which other impurities precipitate along with the vanadate. The vanadium-containing solution can then be treated with an amount of phosphoric acid in excess of that level at which other impurities coprecipitate with the vanadate to assure precipitation of essentially pure vanadate in the absence of impurities.

The phosphoric acid solution can be partially neutralized prior to treatment provided that the pH level is maintained within the ranges discussed above. The acid also may contain any other materials which do not interfere with the solubility of vanadium in the phosphoric acid or with the ability of these methods t precipitate insoluble vanadium compounds from such acids. Illustrative of such other materials are other strong and/or weak acids such as sulfuric acid, hydrochloric acid, hydrofluoric acid, solvents, diluents, simple and complex salts, etc.

Vanadium sources from which vanadium can be recovered by dissolution into phosphoric acid and/or other strong acid in accordance with this invention include all organic and inorganic compositions which contain vanadium and from which vanadium can be dissolved or otherwise abstracted with the acid. I have found that even the most refractory materials, including platinum, gold, silica glass and high nickel alloys, such as those sold under the trademark "Hastelloy," can be dissolved in polyphosphoric acid at elevated temperatures, e.g., 200° C. and higher. Thus, vanadium can be recovered from virgin and processed ores including minerals and rocks, mine and mill tailings (including mining and ore processing residues), ferrous and nonferrous alloys, petroleum coke, petroleum, petroleum ash, ferrophosphorous slag from phosphorous manufacturer, coal, and other sources. More than 65 vanadium ores have been identified, the principle ores being patronite, roscolite, carnotite, and vanadanite. Of course, phosphate rock (primarily calcium phosphate), from which phosphoric acid is manufactured by the sulfuric acid and hydrochloric acid processes, also contains vanadium and is the source of vanadium which exists in wet-process phosphoric acid.

The cations which form insoluble vanadates, and therefore which can be employed to selectively precipitate pentavalent vanadium from the described phosphoric acid solutions, include all cations which form vanadates which are insoluble in the treated phosphoric acid solution and which do not form phosphates which are insoluble in such phosphoric acid solutions. For instance, barium forms insoluble phosphates and is therefore unsuitable for use in these methods. Such cations may already be present in the phosphoric acid solution in which case their addition to the solution is not required. However, when such cations are not already present or are not present in concentrations sufficient to achieve the desired degree of vanadium recovery, their addition is necessary to effect precipitation of dissolved pentavalent vanadium. Such cations include ammonium and metal cations of periodic groups IA, IB, IIA, IIB, IVA, IBV, VIB, VIIB, VIII and combinations of these. Due to their improved reactivity, relatively low cost, and the value of the resulting precipitated vanadate compound, the presently preferred cations include ammonium and the alkali and alkaline earth metal cations which do not form phosphoric acid-insoluble phosphates. Ammonium, sodium, potassium, magnesium, and calcium cations ar particularly preferred.

Such cations can effectively be introduced into the phosphoric acid solution by adding to the solution a metal or an organic or inorganic compound, or combinations thereof, which forms the desired cation in the phosphoric acid solution. Illustrative inorganic compounds include ammonium compounds and oxides, hydroxides and simple and complex salts of the metal cations. (The simple and complex metal salts may also contain ammonium ion.) Useful organic compounds are compounds which contain cations which form insoluble vanadates, e.g., mono-, di-, and trialkyl ammonium compounds, such as salts, e.g., chlorides, carboxylic acid ammonium and/or metal salts, and the like. Relatively pH-neutral compounds, e.g., salts, are presently preferred cation sources due to their ready availability, relatively low cost, and their lack of acid-neutralizing ability. Such compounds do not neutralize the acid and thereby change pH. Thus, they can be used in higher concentrations whereby more selective, efficient recovery of vanadium from the phosphoric acid solution results, particularly when other metal impurities are present. Illustrative of such neutral salts are ammonium, potassium, sodium, magnesium, and calcium sulphates, chlorides, nitrates, etc. Ammonium, sodium, and potassium neutral salts are presently preferred due to their relatively high solubility and pH neutrality. Neutral ammonium-containing compounds are particularly preferred for the production of essentially pure ammonium vanadate.

Since vanadium dissolved in phosphoric acid is often present in a reduced valence state, i.e., at a valence state below 5, the addition of an oxidizing agent is often required to convert such dissolved vanadium to the pentavalent state. However, if sufficient dissolved vanadium already exists in the required pentavalent state, the addition of oxidants is not required to effect removal of that portion of the vanadium.

Suitable oxidants are compounds capable of oxidizing reduced vanadium to the pentavalent state at the concentrations at which the oxidant (or combination of oxidants) is employed. Such oxidants preferably have an oxidation potential higher than the potential of the vanadium (IV) → vanadium (V) oxidation potential (0.74 volt) as defined by the Stockholm Convention (IUPAC 1935) so that a stoichiometric amount of the added oxidant will be capable of oxidizing all vanadium to the pentavalent state. However, oxidants which have standard oxidation potentials lower than the vanadium (IV) → vanadium (V) standard potential can be employed, provided that they are used at concentrations sufficiently higher than the concentration of dissolved vanadium to oxidize the dissolved vanadium to the pentavalent state. The relationship between oxidation potential, oxidant and reductant concentrations, and oxidizing ability, is defined by the Nernst Equation:

$$E = E° - (0.059/n) \log Q$$

wherein,

E is the effective oxidizing potential of the oxidant in the solution (EMF):

$E°$ is the standard oxidation potential of the oxidant defined by the Stockholm Convention (IUPAC 1935) when the activity (which corresponds approximately to molar concentration) of the oxidized and reduced states of the participating atoms is one molar (or corresponds to unit activity as in the case of an insoluble precipitate in contact with the solution);

Q is the activity ratio (which corresponds with concentration ratio) of the oxidized to the reduced state of the involved oxidants and reductants; and n is the number of electrons which are transferred in the oxidation process.

For instance, one electron is transferred in the process of converting vanadium (IV) to vanadium (V). Furthermore, when Q is unity (1), E equals $E°$; i.e., the effective oxidizing potential of the oxidant in the solution corresponds to the standard oxidation potential defined by the Stockholm Convention. When the activity (concentration) of the oxidant in the solution is greater than the activity of the reductant, Q is greater than 1 and E is slightly greater than $E°$; i.e., the effective oxidizing potential of the oxidant in the solution is slightly higher than the Stockholm Convention standard oxidation potential for that oxidant.

As illustrated by the Nernst Equation, oxidants which have standard oxidizing potentials slightly (e.g., 10 percent or less) below the standard potential of the vanadium (IV) → vanadium (V) reaction can oxidize vanadium to the pentavalent state, provided that they are employed in sufficiently high concentrations relative to the concentration of dissolved vanadium. The solubilities (i.e., maximum concentrations) of salts, oxides, and other non-volatile oxidizing compounds can be increased by increasing solution temperature, and the solubility of volatile oxidants, such as oxygen and chlorine, can be increased by increasing the partial pressure of the oxidizing gas over the phosphoric acid solution. Thus, the oxidizing potential of oxidizing gases, such as oxygen, chlorine, etc., can be increased by providing a super-atmospheric partial pressure of the oxidizing gas over the solution, e.g., two atmospheres or more.

Illustrative of presently preferred oxidants are nitric acid, chlorine, bromine, nitrogen oxides, bromates, such as ammonium and alkali metal bromates, perchlorates, such as ammonium and alkali metal perchlorates, manganese dioxide, dichromates (e.g., ammonium, sodium, etc.), hydrogen peroxide, permanganates such as sodium permanganate, iodates such as potassium iodate, ozone, fluorine, perthiosulphates such as ammonium perthiosulphate, organic peroxides, oxygen (pressurized to achieve sufficient oxidizing potential), chromates such as sodium and magnesium chromates, and the like. The useful solutions may optionally contain weak oxidants which may assist in the process by oxidizing solution components other than vanadium and thereby reduce the consumption of the strong oxidant by its reaction with such components.

In accordance with the methods of this invention, the precipitating cation (if not already present) is admixed with the phosphoric acid solution (or solution of other acid before phosphoric acid oxidation) in amounts sufficient to form the desired quantity of insoluble vanadate. Generally, it is preferable to recover as much vanadium as possible. Thus, the precipitating cation will be added in amounts at least equivalent to the stoichiometric amount of vanadate anion present in the solution. In order to assure quantitative separation, it may be desirable to add an excess, e.g., 10 percent excess, of precipitating cation.

The oxidant can be added (if required to convert reduced vanadium to pentavalent vanadium) either before, after, or concurrently with the precipitating cation by admixing the oxidant or oxidants with the acid solution.

The oxidant concentration required to convert a given amount of reduced vanadium to pentavalent vanadium can be determined by simple stoichiometry. Thus, the amount of oxidant admixed with the acid solution should be sufficient to extract at least the number of electrons from the dissolved vanadium required to convert it to the pentavalent state and to make up for oxidant which is consumed by other reductants present in the solution. For instance, wet-process phosphoric acid often contains organic compounds and dissolved carbon which can be oxidized by the oxidizing agent used in these methods. Solutions of other acids can also contain reducing compounds. Accordingly, the amount of oxidant added is preferably sufficient to oxidize all components present in the solution which will reduce the oxidizing agent and to oxidize all of the vanadium present in the solution to the pentavalent state. The exact quantity of oxidant required to achieve this objective in any given case can be determined by adding to a sample of the acid solution to be treated, an excess of the precipitating cation and then titrating the resulting sample with oxidant until the total amount of vanadium known to be present in the solution (by analysis) has been recovered.

Generally, the oxidant concentration should be sufficient to oxidize all reductants in addition to converting all dissolved vanadium to the pentavalent state. Quantitative vanadium recovery can be more adequately assured, however, by employing a slight excess of oxidant, i.e., at least 10 percent in excess of the calculated stoichiometric quantity. The concentration and valence state of vanadium dissolved in the phosphoric acid solution can be readily determined by well known analytical techniques such as x-ray fluorescence, atomic absorption and/or polarography.

The precipitated vanadate compound can be recovered from the phosphoric acid solution by any one of several liquid-solid separation techniques such as filtration, centrifuging, decanting, and the like.

When it is desired to recover vanadium from a vanadium source by dissolving the vanadium with acid, the vanadium source is contacted with sufficient acid of sufficient concentration to dissolve the desired amount of vanadium from the vanadium source. More concentrated acid solutions having lower pH levels are capable of dissolving more difficultly soluble materials. Polyphosphoric acid is capable of dissolving vanadium even from the most refractory materials such as vanadium-nickel-cobalt alloys and the like, particularly at elevated temperatures. Thus, such difficultly dissolvable materials can be treated with polyphosphoric acid at elevated temperatures, e.g., in excess of 100° C. or in excess of 150° C., to produce the desired solution. Polyphosphoric acid containing at least 20 percent polymeric phosphoric acid can be employed to dissolve essentially all known alloys at temperatures of about 200° C. and above. The dissolved vanadium can be selectively recovered from the resulting acid solution by the addition of precipitating cations and/or oxidants as described above.

The invention is further described by the following examples which are illustrative of specific modes of practicing the invention and are not intended as limiting the scope of the invention as defined by the appended claims.

EXAMPLE 1

One liter of merchant grade, green phosphoric acid having an equivalent $P_2O_5$ analysis of 52 weight percent and containing approximately 1100 mg. of dissolved vanadium in addition to other impurities including sulfuric acid, aluminum, iron, fluorine, silica (as compounds), and others, was admixed, at a pH below 1, with 100 ml. of an aqueous solution containing 35 weight percent nitric acid and 26 weight ammonium nitrate at 90° C. for about 30 minutes. A bright yellow precipitate formed rapidly and the solution effervesced. Approximately 2 grams of the bright yellow precipitate was recovered by filtration and was shown by analysis to be essentially pure ammonium metavanadate ($NH_4VO_3$). No other metal was detected in the precipitate at a detection limit of 1 ppm. A sample of the gas which effervesced from the solution during the reaction was obtained and was shown to be nitrogen by gas analysis. Analysis of the filtrate established that the soluble vanadium content of the remaining phosphoric acid was less than 200 mg.

EXAMPLE 2

Vanadium can be recovered from 2 pounds of finely divided, high speed, steel scrap containing 2.5 weight percent vanadium by dissolving the steel scrap in 1 gallon of polyphosphoric acid having a pH below 1 and in which 40 percent of the $P_2O_5$ is present as polyphosphate at 150° C. for 3 hours with agitation. The dissolved vanadium can be recovered from the resulting polyphosphoric acid solution by gradually adding to the solution 0.03 pound of hydrogen peroxide followed by dissolving in the oxidized solution 0.2 pound of ammonium phosphate.

EXAMPLE 3

Vanadium can be recovered from 1 liter of spent 80 percent $H_2SO_4$ pickling acid containing 1 weight percent vanadium (expressed as the element) and other metals including iron, cobalt, and nickel, by admixing with the sulfuric acid solution 200 cc. of 50 percent phosphoric acid, 50 cc. of 100 percent nitric acid, and 10 grams of ammonium sulphate to selectively produce an ammonium vanadate precipitate which can be separated from the sulfuric acid solution by filtration.

While particular embodiments of this invention have been described, it will be understood, of course, that the invention is not limited thereto since many obvious modifications can be made, and it is intended to include within this invention any such modifications as will fall within the spirit and scope of the appended claims. In particular, reference should be made to my applications Ser. No. 06/688,685, filed Jan. 3, 1985, for METHODS FOR RECOVERING VANADIUM FROM ACIDS AND VANADIUM SOURCES and 06/688,683, filed Jan. 3, 1985, for METHODS FOR RECOVERING VANADIUM FROM PHOSPHORIC ACID AND VANADIUM SOURCES, both now abandoned, and my copending application Ser. No. 07/110,172, filed Oct. 19, 1987, for METHODS FOR RECOVERING VANADIUM FROM PHOSPHORIC ACID, now U.S. Pat. No. 4,851,199, all of which are incorporated herein by reference in their entireties.

I claim:

1. A method for selectively recovering a simple vanadate from a vanadium-containing phosphoric acid solution containing impurity metals other than vanadium, which method comprises the steps of (a) converting said vanadium, at a pH of about 2 or less, to a simple vanadate compound insoluble in said phosphoric acid solution at a pH of about 2 or less, and (b) separating the resulting, insoluble, simple vanadate compound from said phosphoric acid solution, in the substantial absence of compounds other than said simple vanadate.

2. A method for selectively recovering a simple vanadate from a vanadium-containing phosphoric acid solution containing at least about 10 weight percent phosphoric acid expressed as $P_2O_5$ and metals in addition to vanadium, which method comprises providing in said vanadium-containing phosphoric acid solution (a) an oxidant capable of converting vanadium having a valence below 5 to pentavalent vanadium, and (b) a compound containing a cation which forms simple vanadates insoluble in said phosphoric acid solution and which does not form phosphates insoluble in said phosphoric acid solution.

3. A method for selectively recovering vanadium from a vanadium-containing phosphoric acid solution containing impurity metals other than vanadium, which method comprises providing in said phosphoric acid solution, at a pH of about 1 or less, (a) an oxidant capable of converting vanadium which has a valence state below 5 to pentavalent vanadium and (b) a compound selected from the group consisting of ammonia and compounds containing sodium, potassium, ammonium, calcium, or magnesium cations, and combinations thereof, in proportions sufficient to precipitate at least a portion of said vanadium from said acid solution as a vanadate selected from the group consisting of sodium, potassium, ammonium, calcium, and magnesium vanadates and combinations thereof, in the substantial absence of metal-containing compounds other than said vanadate.

4. A method for selectively recovering vanadium from an acid-soluble vanadium-containing material which also contains acid-soluble metals other than vanadium, which method comprises dissolving at least a portion of said vanadium in a phosphoric acid solution, providing in the resulting vanadium-containing phosphoric acid solution (a) an oxidant capable of converting vanadium having a valence below 5 to pentavalent vanadium and (b) a compound which forms vanadates insoluble in said phosphoric acid solution and which does not form phosphates insoluble in said phosphoric acid solution, under conditions sufficient to selectively precipitate said vanadate from said phosphoric acid solution in the substantial absence of metal-containing compounds other than said vanadate.

5. A method for selectively recovering vanadium from a vanadium-containing material which contains metals other than vanadium soluble in strong acid, which method comprises the steps of dissolving at least a portion of said-material in acid to form a vanadium-containing acid solution containing metals in addition to vanadium, providing in said vanadium-containing acid solution (a) an amount of phosphoric acid sufficient to prevent the precipitation of said metals concurrently with the precipitated vanadate hereinafter defined, (b) an oxidant capable of oxidizing said vanadium to pentavalent vanadium and (c) a compound which forms vanadates insoluble in said acid solution, under conditions sufficient to selectively precipitate said vanadate from said acid solution in the substantial absence of metal-containing compounds other than said vanadate.

6. The method defined in claim 1, wherein step (a) comprises providing in said vanadium-containing phosphoric acid solution a compound containing a cation which forms corresponding, simple vanadate compounds insoluble in said phosphoric acid solution and which does not form phosphate compounds insoluble in said phosphoric acid solution.

7. The method defined in any one of claims 1–4 or 5, wherein said vanadium is converted to said insoluble vanadate at a pH of about 1 or less, and said solution comprises at least about 10 weight percent phosphoric acid.

8. The method defined in claim 1, wherein step (a) comprises providing in said vanadium-containing phosphoric acid solution an oxidant capable of converting vanadium having a valence below 5 to pentavalent vanadium.

9. The method defined in claim 8, wherein step (a) comprises providing in said vanadium-containing phosphoric acid solution a compound containing a cation which forms a simple vanadate compound insoluble in said phosphoric acid solution and which does not form phosphate compounds insoluble in said phosphoric acid solution.

10. The method defined in any one of claims 2, 4, 5 or 6, wherein said cation is selected from the group consisting of ammonium and alkali and alkaline earth metal cations, and combinations thereof.

11. The method defined in any one of claims, 2, 4, 5 or 6 wherein said compound provided in said solution is selected from the group consisting of ammonia and compounds containing sodium, potassium, ammonium, calcium, or magnesium cations, and combinations thereof.

12. The method defined in any one of claims 2, 4, 5 or 6 wherein said compound provided in said solution is selected from the group consisting of ammonia and compounds having cations of metals selected from periodic groups IA, IIA, IIB, IVA, IVB, VIB, VIIB, or VIII, and combinations thereof.

13. The method defined in any one of claims 1–4 or 5, wherein said vanadium-containing acid solution comprises at least about 10 weight percent phosphoric acid expressed as $P_2O_5$.

14. The method defined in any one of claims 1–4 or 5, wherein said vanadium-containing acid solution comprises at least about 30 weight percent phosphoric acid expressed as $P_2O_5$.

15. The method defined in any one of claims 1–3 or 4, wherein said vanadium-containing phosphoric acid solution comprises wet-process phosphoric acid.

16. The method defined in any one of claims 1–3 or 4, wherein said vanadium-containing phosphoric acid solution comprises polyphosphoric acid.

17. The method defined in any one of claims 2–5 or 6, wherein said compound admixed with said vanadium-containing phosphoric acid solution comprises a member selected from the group consisting of ammonia, ammonium-containing compounds, and combinations thereof, and at least a portion of said vanadium is precipitated as ammonium vanadate.

18. The method defined in any one of claims 2–5 or 6, wherein said compound provided in said solution is selected from the group consisting of ammonium hydroxide, ammonia, inorganic ammonium salts, and combinations thereof, and at least a portion of said vanadium is precipitated as ammonium vanadate.

19. The method defined in any one of claims 2–5 or 6, wherein said solution comprises at least about 10 weight percent phosphoric acid expressed as $P_2O_5$, said compound provided in said solution is selected from the group consisting of ammonia, ammonium-containing compounds, and combinations thereof, and at least a portion of said vanadium is precipitated from said solution as ammonium vanadate.

20. The method defined in any one of said claims 2–5 or 8, wherein said oxidant is selected from the group consisting of nitric acid, chlorine, nitrogen oxides, bromates, perchlorates, manganese dioxide, dichromates, hydrogen peroxide, permanganates, iodates, ozone, bromine, fluorine, perthiosulphates, organic peroxides, oxygen, chromates, and combinations thereof.

21. The method of any one of claims 2–5 or 6, wherein said vanadium-containing acid solution comprises at least about 10 weight percent phosphoric acid expressed as $P_2O_5$, and said compound is selected from the group consisting of ammonia, and compounds containing sodium, potassium, ammonium, calcium, or magnesium cations, and combinations thereof.

22. The method define in any one of claims 1–3 or 4 wherein said phosphoric acid solution further comprises an acid other than phosphoric acid.

* * * * *